United States Patent [19]

Sorensen

[11] 4,345,802

[45] Aug. 24, 1982

[54] DISPENSER

[75] Inventor: Egon Sorensen, Cheyenne, Wyo.

[73] Assignee: AMF, Inc., White Plains, N.Y.

[21] Appl. No.: 188,155

[22] Filed: Sep. 17, 1980

[51] Int. Cl.³ .............................................. A47B 57/00
[52] U.S. Cl. ..................... 312/42; 312/306; 312/312; 220/8; 186/22; 108/91
[58] Field of Search ............... 312/42, 312, 306, 205, 312/91, 134, 268, 304, 307, 270; 186/22; 108/21, 91; 211/49 D; 220/8

[56] References Cited

U.S. PATENT DOCUMENTS

| | | | |
|---|---|---|---|
| 301,227 | 7/1884 | Giles | 186/22 |
| 1,030,376 | 6/1912 | Baecker | 312/134 |
| 1,078,249 | 11/1913 | Burns | 312/312 |
| 1,516,382 | 11/1924 | Evenson . | |
| 2,904,209 | 9/1959 | Murdock, Sr. | 220/8 |
| 2,944,540 | 7/1960 | Littell, Jr. | 312/312 |
| 3,361,510 | 1/1968 | McDermott | 312/312 |
| 3,415,586 | 12/1968 | Hammond . | |
| 3,650,591 | 3/1972 | Longmire, Sr. | 312/312 |
| 3,985,410 | 10/1976 | Young et al. | 312/306 |

FOREIGN PATENT DOCUMENTS 54400 12/1910 Switzerland ............................ 220/8

*Primary Examiner*—Victor N. Sakran
*Attorney, Agent, or Firm*—David E. Dougherty; Charles J. Worth

[57] ABSTRACT

An overhead dispenser having vertically telescopic movable shelf units.

5 Claims, 6 Drawing Figures

DISPENSER

This invention relates to an article dispenser, and more particularly, to an overhead article dispenser.

The invention will be described with respect to a dish dispenser for restaurants, but the invention has other useful applications. Automatic dish dispensers having a table that rises as dishes are removed are well known and successful in the food serving trade. However, these units require floor or counter space which is at a premium in busy kitchens and food service areas. The invention conserves on this premium space.

Briefly, in the invention a low cost and practical overhead dispenser is provided which uses the overhead space which ordinarily is not being used.

The invention will be best understood by considering the attached drawings in which FIG. 1 is a perspective view of a commercial form of my invention in which all 3 movable shelf units are empty and have been raised off the bottom dispensing base of the unit;

Figure 1:
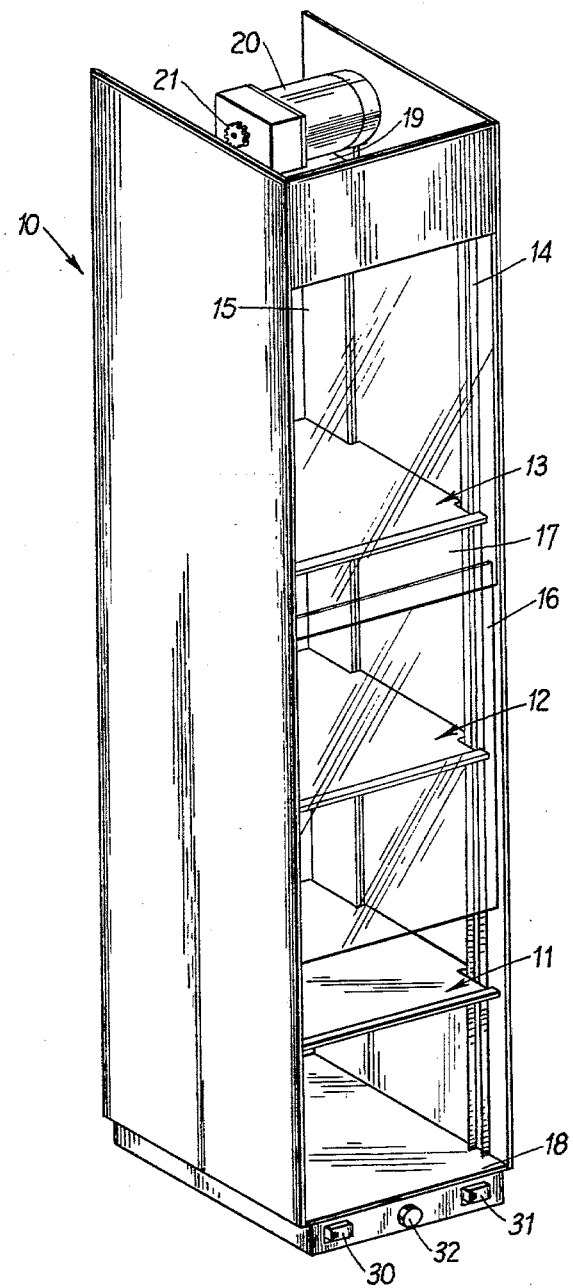

Referring now first to FIG. 1 of the drawings, shown therein is an upright rectangular cabinet 10 which can be suspended off a ceiling or wall mounted above a counter top. Mounted inside the cabinet 10 are 3 movable telescopic shelf units 11, 12, 13. Shelf units 11–13 travel up and down in cabinet 10. They are vertically guided inside the cabinet by vertical guides 14, 15. The front of cabinet 10 is closed by sliding glass panels 16, 17. The cabinet has a base 18 on which dishes can be loaded, see FIG. 3, and a top 19, see FIG. 2, on which is mounted a drive mechanism, see FIG. 4, comprising a reversible motor 20, gearworks 21, cable shaft 22, and lift cable 23 connected to the cross piece 24 of the top one 13 of the movable shelves.

The shelf units 11–13 are generally square cubes or boxes which are open at their front sides and top. In other words, see FIG. 5, they have bases or bottoms 11′, 12′, 13′, opposite lateral sides 11″, 12″, 13″, and rear sides 11‴, 12‴, 13‴; but not top or front side panels, as illustrated in FIG. 5, a view of the two uppermost movable shelf units 12 and 13.

Figure 4:
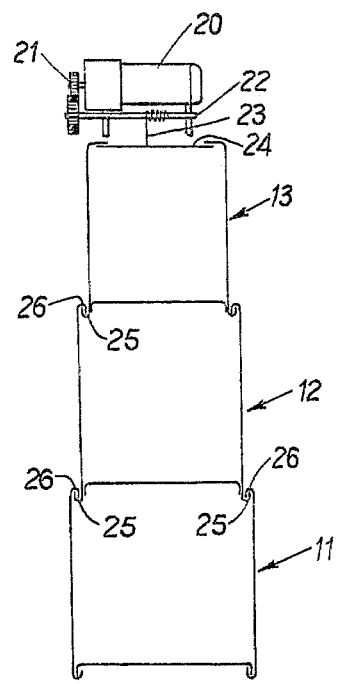
FIG. 4 is an illustration of the salient movable parts of the device.
Figure 5:
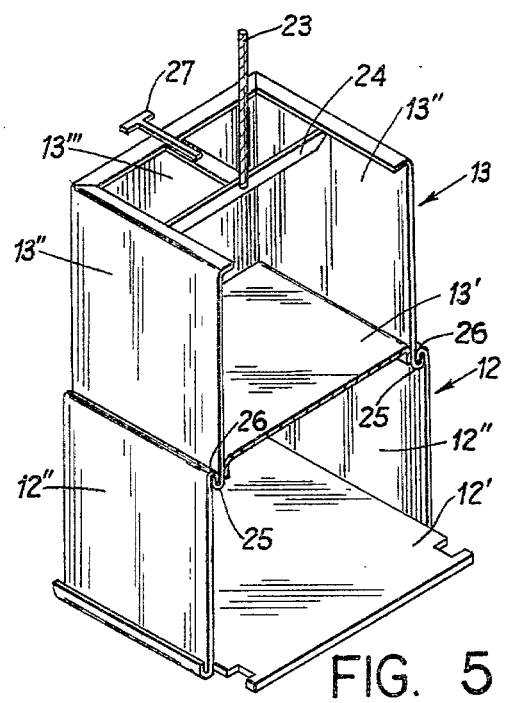

As best seen from FIGS. 4 and 5, the stack of shelf units, boxes, or cubes 11–13 are vertically and telescopically movable with respect to each other either to expand (up) or collapse (down). Adjacent units slide one (upper) within the other (lower). They do not come apart since the ends of adjacent units are adapted to interlock with each other. That is to say, the bottom and top of adjacent units are provided with out turned and in turned U-shaped lips, rims, or flanges 25 and 26 respectively that catch on each other before adjacent units can separate, and also to facilitate lifting of one unit by the other in a serial fashion. The U-shaped catch lips 25, 26 are provided all around the shelf units along their lateral and back side panels.

Figure 6:
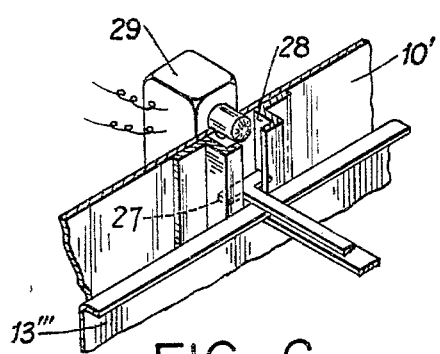
FIGS. 5 and 6 are enlarged detail views of isolated portions of the device.

Referring to FIG. 6, the top shelf unit 13 has a finger 27 on it that operates in a vertical guideway 28 formed on the back panel 10′ of the cabinet 10. Mounted on this back panel 10′ are a series of appropriately positioned limit switches 29 to stop the shelves 11–13 as they are sequentially raised and lowered, the finger 27 striking the limit switches 29 at the appropriate time or distance of travel. Positioned at the bottom of the cabinet 10 is a left side up switch button 30, a right side down switch button 31, and a central emergency stop switch button 32.

Figure 2:
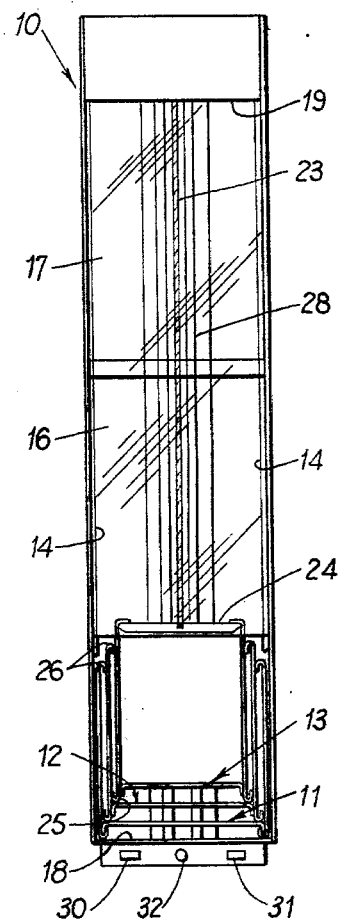
FIG. 2 is a front elevation view of the unit with all the movable shelves being empty and lowered.
Figure 3:
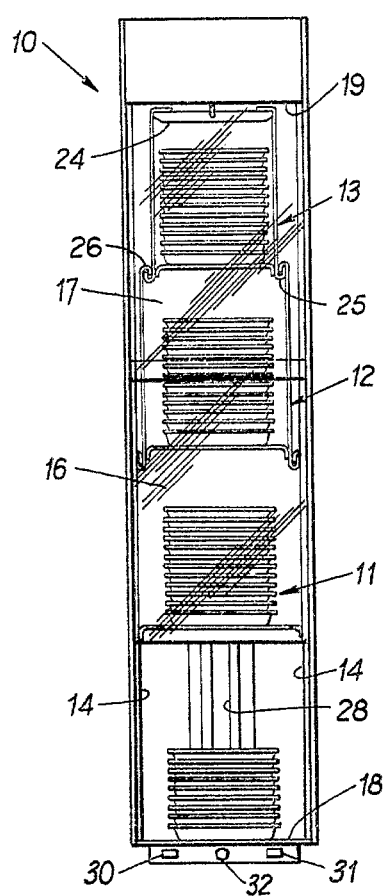
FIG. 3 is a view similar to FIG. 1 but showing all movable shelfs and the base loaded with dishes.

Operation (loading and unloading) of the device will now be described. In FIG. 2 all the shelves 11–13 are bottomed on the base 18 of the cabinet and all are empty. The button 29 is pushed to raise the shelves 11–13 to the position shown in FIG. 1. Shelf 13 is loaded first and moved first. After it is raised to the point that its U-shaped lip 25 catches on the lip 26 of the unit 12 the finger 27 strikes a limit switch 29 and unit 13 stops. Unit 12 is then loaded with dishes, the button 30 pressed, and unit 13 raises the next step to hoist the shelf 12 to expose the shelf 11. At this time lips 25, 26 of shelfs 12 and 11 have interlocked and hoisting movement was stopped. Then shelf 11 is loaded with dishes and button 30 again pressed to raise shelf 11 off the cabinet base 18. At this time the base 18 is loaded with dishes, so that the entire cabinet is loaded with dishes in the manner illustrated in FIG. 3.

In unloading, the reverse procedure is followed. Bottom 18 is unloaded, the button 31 is pressed to lower the expanded shelfs until such time as shelf 11 bottoms on cabinet base 18. Then shelf 11 is unloaded, the button 31 pressed again, until shelf 12 bottoms on shelf 11 and is unloaded. The button 31 is pressed again to bottom shelf 13 on empty shelf 11. After shelf 13 is unloaded the unit is as shown in FIG. 2.

While there has been shown and described one form of the invention it will be obvious to those skilled in the art that the invention has applicability beyond the particular illustrated form of the invention. For example, the invention could use shelfs of different shape, and just one movable one, or several as shown, or still more. Therefore the true measure and scope of the invention should be measured by the appended claims.

I claim:

1. An overhead article dispenser comprising an elongated vertically positioned cabinet, an article dispensing base in said cabinet, a series of telescopically related boxes in said cabinet, said boxes being open at their top and front sides, means on the top and bottom of immediately adjacent boxes to keep them from separating when expanded with respect to each other, a reversible hoist mechanism on said cabinet to alternately expand and collapse said boxes with respect to each other sequentially one at a time, said boxes when fully expanded being raised off said base whereby articles to be dispensed can be positioned on said base as well as in said boxes, and said boxes when collapsed sequentially bottoming on said base and each other.

2. An overhead article dispenser as in claim 1, said keep means comprising out turned and in turned U-shaped rims on the adjacent ends of immediately adjacent expanded boxes which rims are adapted to catch on each other, said hoist mechanism comprising a reversible electrical motor, a cable shaft, a gearwork connected said motor to said shaft, and a cable connecting the uppermost one of said boxes to said shaft, and control means comprising a pair of switch buttons on said cabinet for operating said motor in alternate directions.

3. An overhead article dispenser as in claim 2 which is adapted to have a stack of dishes positioned in each of said boxes and on said base, said cabinet having a rectangular shape and said telescopically related boxes being generally square in shape with bottom, opposite lateral sides and rear panels but being open at the front and tops thereof, said bottom panels comprising a series of movable dish receiving and dispensing shelfs in said cabinet, means in said cabinet for vertically guiding said shelfs up and down in said cabinet, the front of said cabinet being open, and sliding glass panels on the front of said cabinet to afford access to said cabinet base and shelfs.

4. An overhead article dispenser comprising an elongated vertically positioned cabinet having a base and a plurality of shelves each shelf and said base being adapted to be loaded with articles to be dispensed, means interconnecting adjacent shelves for permitted limited vertical movement with respect to one another, reversible hoist means connected to the uppermost shelf to alternately move said shelves singly and sequentially upwardly away from each other terminating with the lowermost shelf moving away from said base to load each of said shelves and said base and downwardly toward each other commencing with moving the lowermost shelf toward said base after articles have been dispensed from said base and said shelves.

5. An overhead article dispenser as in claim 4, and control means for energizing said hoist means in a desired direction;

limit switch means for stopping when operated said hoist means; and each of said shelves having means for operating said limit switch means after said permitted limited vertical movement.

* * * * *